(12) United States Patent
Li et al.

(10) Patent No.: US 8,465,857 B2
(45) Date of Patent: Jun. 18, 2013

(54) PROTON EXCHANGE MEMBRANES (PEM) BASED ON HYBRID INORGANIC-ORGANIC COPOLYMERS WITH GRAFTED PHOSPHORIC ACID GROUPS AND IMPLANTED METAL CATIONS

(75) Inventors: Wen Li, Ypsilanti, MI (US); Siwen Li, Atlanta, GA (US); Meilin Liu, Norcross, GA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 480 days.

(21) Appl. No.: 12/885,926

(22) Filed: Sep. 20, 2010

(65) Prior Publication Data

US 2011/0009504 A1 Jan. 13, 2011

Related U.S. Application Data

(62) Division of application No. 11/127,458, filed on May 12, 2005, now Pat. No. 7,811,693.

(60) Provisional application No. 60/570,692, filed on May 13, 2004.

(51) Int. Cl.
   *H01M 8/10* (2006.01)
(52) U.S. Cl.
   USPC ............. 429/33; 429/314; 429/317; 521/27
(58) Field of Classification Search
   USPC ................... 429/33, 314, 317; 521/27
   See application file for complete search history.

(56) References Cited

U.S. PATENT DOCUMENTS

| 4,028,390 A | 6/1977 | Rubino et al. |
| 4,148,812 A | 4/1979 | Rubino et al. |

(Continued)

FOREIGN PATENT DOCUMENTS

| WO | WO-2005/114772 A2 | 12/2005 |
| WO | WO-2005/114772 A2 * | 12/2005 |

OTHER PUBLICATIONS

K.A. Mauritz, "Organic-inorganic hybrid materials: perfluorinated ionomers as sol-gel polymerization templates for inorganic alkoxides," Materials Science and Engineering C, vol. 6, No. 2-3, Nov. 1, 1995, pp. 121-133.

(Continued)

*Primary Examiner* — Peter D. Mulcahy
*Assistant Examiner* — Henry Hu
(74) *Attorney, Agent, or Firm* — Gifford, Krass, Sprinkle, Anderson & Citkowski, P.C.

(57) ABSTRACT

A proton exchange membrane comprises a hybrid inorganic-organic polymer that includes implanted metal cations. Acid groups are bound to the hybrid inorganic-organic polymer through an interaction with the implanted metal cations. An example process for manufacturing a proton exchange membrane includes sol-gel polymerization of silane precursors in a medium containing the metal cations, followed by exposure of the metal-implanted hybrid inorganic-organic polymer to an acid compound.

15 Claims, 9 Drawing Sheets

U.S. PATENT DOCUMENTS

| | | |
|---|---|---|
| 6,248,469 B1 | 6/2001 | Formato et al. |
| 6,387,230 B1 * | 5/2002 | Murphy et al. ............... 204/296 |
| 6,630,265 B1 * | 10/2003 | Taft et al. ...................... 429/491 |
| 6,962,959 B2 * | 11/2005 | Kurano et al. ............. 525/326.1 |
| 7,309,523 B2 | 12/2007 | Roziere et al. |
| 7,358,288 B2 | 4/2008 | Kerres |
| 7,387,732 B2 | 6/2008 | Kerres et al. |
| 2004/0062970 A1 | 4/2004 | Nomura et al. |
| 2004/0101760 A1 | 5/2004 | Kerres et al. |
| 2005/0113547 A1 | 5/2005 | Li et al. |

OTHER PUBLICATIONS

B. Bonnet et al, "Hybrid organic-inorganic membranes for medium temperature fuel cell," Journal of New Materials for Electrochemical Systems, vol. 3, No. 1, Jan. 1, 2000, pp. 87-92.

L. Depre at al, "Organic-inorganic hybrid protonic polymeric electrolytes grafted by sulfonic acid/sulfonamide moieties," Materials Research Society Symposium Proceedings, vol. 575, Apr. 5, 1999, pp. 253-255.

\* cited by examiner

PROTON EXCHANGE MEMBRANES (PEM) BASED ON HYBRID INORGANIC-ORGANIC COPOLYMERS WITH GRAFTED PHOSPHORIC ACID GROUPS AND IMPLANTED METAL CATIONS

REFERENCE TO RELATED APPLICATIONS

This application is a divisional of U.S. patent application Ser. No. 11/127,458, filed May 12, 2005 now U.S. Pat. No. 7,811,693, which claims priority from U.S. Provisional Patent Application Ser. No. 60/570,692, filed May 13, 2004, the entire contents of both of which are incorporated herein by reference.

FIELD OF THE INVENTION

The present invention relates to proton exchange membranes, in particular to proton exchange membranes including metals.

BACKGROUND OF THE INVENTION

The properties of a proton-conducting membrane, also called a proton exchange membrane or proton electrolyte membrane (PEM), significantly influence PEM-based fuel cell performance. Problems with currently available membranes (such as perfluorosulfonic polymers) include low thermal stability under acidic conditions and dramatic loss in proton conductivity above 100° C. To overcome these problems, complicated sub-systems become necessary, including those for thermal and water management. Hence, there is an urgent need for PEMs having improved stability and performance.

SUMMARY OF THE INVENTION

A proton exchange membrane comprises a hybrid inorganic-organic polymer including metal cations, the metal cations being substantially uniformly distributed through the hybrid inorganic-organic polymer and not present in the form of particles. The metal cations are included into the polymer network at the time of formation of the network, through adding metal cations into the medium in which the network is formed. The proton exchange membrane also includes proton donor groups, such as acid groups, bound to the hybrid inorganic-organic network by an interaction with the metal cations. The acid groups may be phosphonic acid groups, and may be part of an acid compound such as phosphoric acid or derivative thereof. The acid groups may be provided by an acid compound of the form A-L-B, where A is the acid group, L is a linking group or a chemical bond, and B is a terminal group, such as an aromatic heterocycle having at least one heteroatom selected from the group consisting of N, O, and S, or a second acid group.

The metal cations may be cations of one or more metals selected from the group consisting of Mg, Ca, Sr, Ba, Al, Fe, W, Zn, Mn, Zr, Mo, Nb, Ti, V, Co, Pb, Ga, In, Ge, and Sn. In other examples, the metal cations are cations of one or more transition metals, or other metal or semi-metal capable of replacing atoms in a conventional inorganic matrix (for example, a metal atom which may replace silicon in an organosilicon or silica type matrix).

The hybrid inorganic-organic network may be a reaction product of a sol-gel polymerization of one or more silane that occurs in a medium (for example, a solution or gel) containing the metal cations. The metal cations are preferably present as a species soluble in the medium, for example as a hydrolysable metal compound such as an alkoxymetal compound, such as a tetralkoxy compound. The formed hybrid inorganic-organic network then includes inorganic portions comprising silicon atoms and oxygen atoms, from silane hydrolysis, and in addition the metal cations from alkoxymetal hydrolysis.

Examples of the present invention also include metal-implanted inorganic-organic polymers, where metal cations are substantially uniformly distributed through the polymer. Example metal-implanted polymers are the sol-gel reaction product of one or more silane precursors and an alkoxymetal compound.

A process for manufacturing a proton exchange membrane comprises forming a metal-implanted hybrid inorganic-organic polymer through a sol-gel polymerization of one or more silane precursors in a medium containing metal cations, and exposing the metal-implanted hybrid inorganic-organic polymer to an acid compound, the acid compound binding to the polymer through interaction with the metal cations. The polymer may then be formed into a membrane, which may be used in an improved fuel cell.

DETAILED DESCRIPTION OF THE INVENTION

Implanting metal cations, of one or more metal cation species, into an inorganic-organic membrane prior to grafting phosphonic acid groups can result in high dispersion of metal phosphate and thus increase the uptake of phosphonic acid groups. Membranes according to examples of the present invention showed great increase in proton conductivity, especially at low temperatures under anhydrous conditions.

Organic precursors, such as alkoxysilanes, can be used to form polymer chains or networks in a proton conducting membrane. The polymer chains or networks are thermally and chemically stable.

Metal cations can be implanted into the framework of a proton conductive membrane. Acid groups such as phosphonic acid, or other groups, can then be chemically grafted on to metal cation sites in the implanted proton conducting membrane. Functions of the framework-implanted metal ions include fixing the phosphoryl group, and partially decreasing the electron density of grafted phosphoryl groups so as to increase proton mobility in the hybrid membrane. Implanted metal cations can improve uptake of phosphonic acid groups, which act as proton donors, enhance proton conductivity, thermal stability, and acidity at low temperatures under anhydrous conditions. The metal cations can be more evenly dispersed than in any previous conventional approach.

Implanted metal cations may include one or more metal cation species selected from the group consisting of $Mg^{2+}$, $Ca^{2+}$, $Sr^{2+}$, $Ba^{2+}$, $Mn^{2+}$, $Fe^{2+}$, $Al^{3+}$, $Pb^{2+}$, $Zr^{4+}$, $Mo^{6+}$, $Nb^{4+}$, $Ti^{4+}$, $V^{5+}$, and $Co^{2+}$, or other metal cations.

Using conventional approaches, it is possible to disperse $Zr(PO_4H)_2$ and similar compounds in a hybrid inorganic-organic matrix as particles. In such cases, Si—O—Zr bonds are formed only on the surface of the particles. However, by forming the hybrid inorganic-organic matrix in a medium containing metal cations, the metal cations were implanted uniformly into the network before the metal sites have a chance to react with $H_3PO_4$, or —R—$PO_3H_2$ to form the network.

Figure 1:
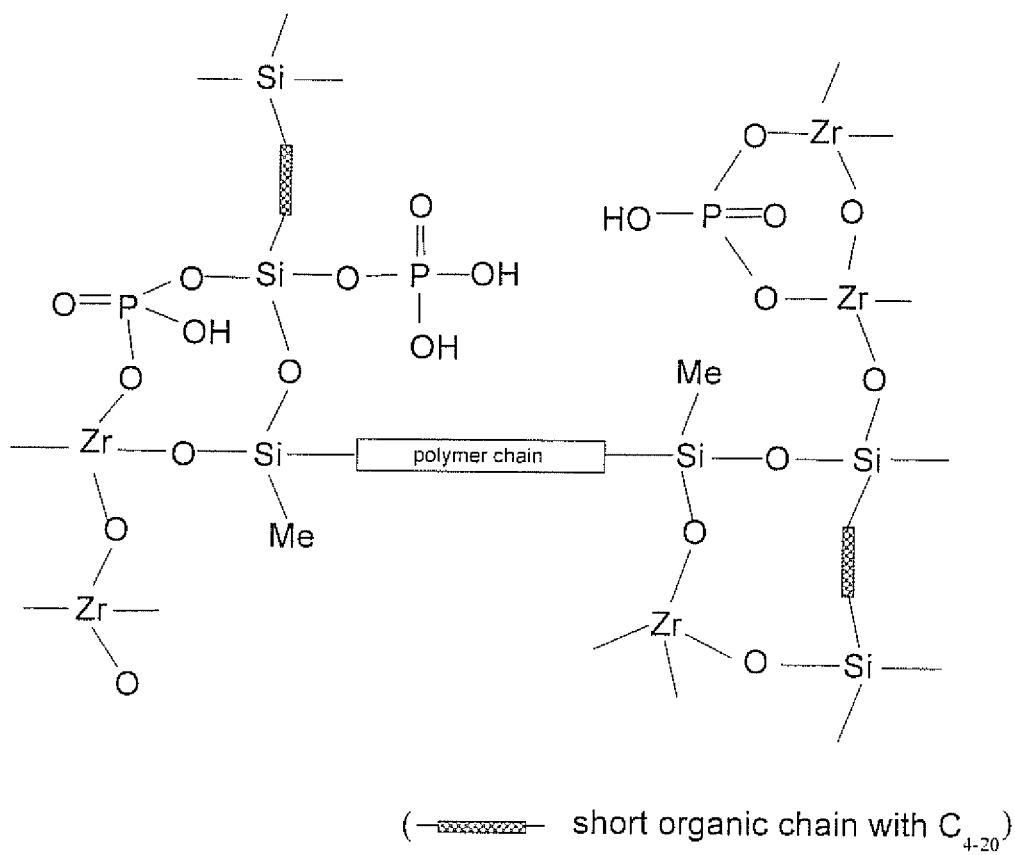
FIG. 1 illustrates the structure of a hybrid inorganic-organic copolymer network containing H3PO4 molecules bound to Zr.

FIG. 1 shows a structure of an inorganic-organic matrix including zirconium ions. The matrix can be formed by sol-gel polymerization of silane precursors in a medium including $Zr(OBu)_4$, or other tetralkoxy compound or which hydrolyzes in a sol-gel reaction in a manner similar to the silane precursors, the Zr atoms taking the place of some Si atoms in the inorganic part of the matrix so that Zr becomes part of the hybrid inorganic-organic network. In this case, the Zr—O—P groupings are not due to the presence of Zr-containing particles. This represents a unique form of Zr—O—P cluster in a polymer, which has never before been reported.

The Figure shows an inorganic-organic hybrid matrix comprising inorganic portions comprising silicon and oxygen, polymer chains, and short organic chains with 4-20 carbon atoms. In other examples, other combinations of polymers, oligomers, and organic chains can be present.

Figure 2A:
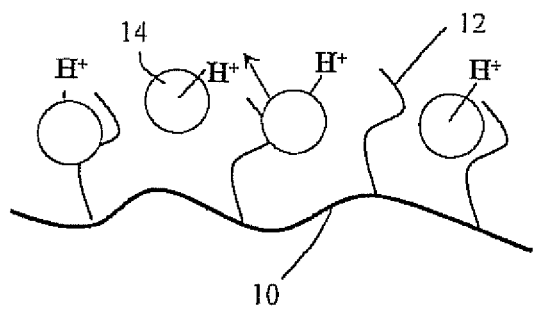
FIGS. 2A-2C illustrate approaches to enhancing proton conductivity.
Figure 2B:
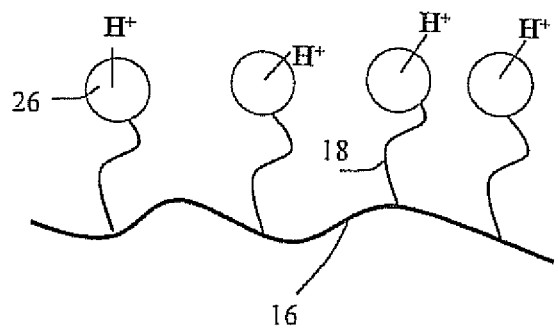
Figure 2C:
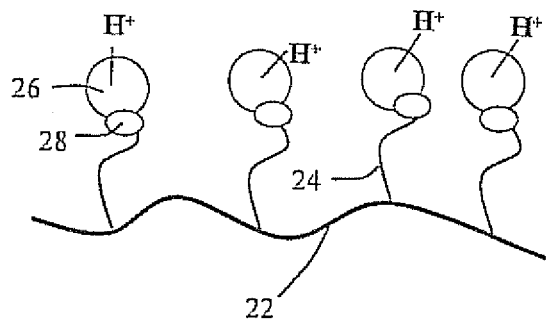

FIGS. 2A-2C illustrate various approaches to increasing proton conductivity of a PEM.

FIG. 2A schematically represents phosphonic acid groups 14 adsorbed into side-chains 12 of an inorganic-organic matrix, the side-chains 12 being attached to main-chain 10, so as to increase thermal stability (relative to sulfonic acid groups). However, the free acid molecules could be leached out under fuel cell operation conditions, degrading performance.

FIG. 2B schematically represents phosphonic acid groups 26 grafted onto side chains 18 of polymer 16, to prevent loss of the proton donors. However, the proton mobility is much lower than with free acid molecules.

FIG. 2C schematically represents metal ions implanted onto an organic side chain 24 of a polymer having main chain 22. The implanted metal ions 28 partially withdraw electron density from the proton donor 26 so as to increase proton mobility and proton conductivity, and form highly dispersed proton donor stations within the PEM.

The metal ions are first implanted onto the organic side chain, then phosphoric acid is grafted into the matrix to form proton donor stations, and the metal ion can partially withdraw electron density from the tetrahedral phosphorus, thus increasing proton mobility. The highly dispersed metal ions within the polymer framework form highly dispersed proton donor stations, which can result in high proton conductivity under low humidity and low temperature.

Highly dispersed and successive proton transfer stations (fixed phosphonic acid groups with high proton mobility) are provided within the PEM so that protons can freely transfer under low relative humidity (RH), and even anhydrous conditions, through membrane even at higher temperatures (>100° C.). In comparison, addition of α-zirconium phosphate (α-ZrP) particles to an inorganic-organic hybrid membrane may greatly enhance proton conductivity under high RH conditions. However, under low RH, zirconium phosphate shows very low proton conductivity due to inadequate amount of water to transfer protons from one particle to another in the membrane, particularly where the clusters are relatively large due to poor dispersion of the metal cations resulting from precursor aggregation.

Figure 3A:
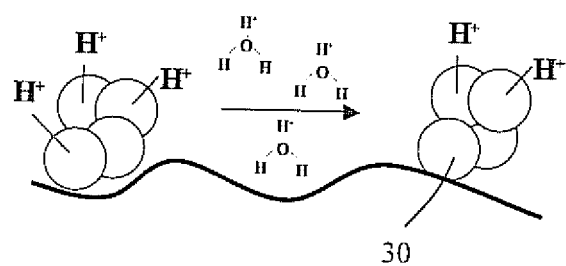
FIGS. 3A and 3B illustrate the fall in proton conductivity of membranes containing large crystals of zirconium phosphate at low relative humidity (RH)
Figure 3B:
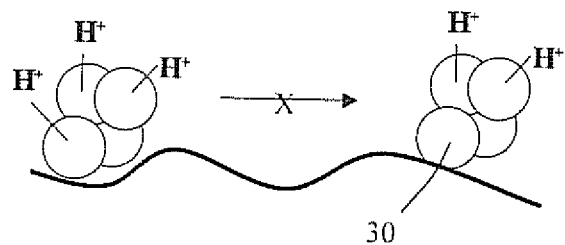

FIG. 3A illustrates proton transfer between large crystals (such as crystal 30) at high relative humidity (RH), whereas FIG. 3B illustrates proton transfer not occurring at low RH. Preferably, formation of large crystals of zirconium oxide or zirconium phosphate (or other implanted compound) is avoided.

Phosphonic acid groups can replace sulfonic acid groups in hybrid inorganic-organic polymers to improve the thermal stability of the PEM membranes under acidic conditions. Free phosphoric acid is readily leached out of the membranes, or grows to large particles, resulting in loss of proton conductivity. Phosphonic acid groups can also be grafted onto the backbone of the polymer to minimize leaching out. Unfortunately, proton conductivity decreases due to a decrease in mobility of proton that was originally carried by free phosphoric groups in membrane materials. Proton conductivity can be increased by increasing proton mobility.

Hybrid inorganic-organic proton exchange membranes can be formed from polymerization (as used herein, the term polymerization includes copolymerization) of one or more species of precursors. Precursors may form organic polymer chains or networks thermally or chemically in a membrane fabrication process. Precursors include compounds having a hydrolysable silicon-containing group, a linking group, and a functional group. For example, a precursor may have a structure according to Scheme 1 below:

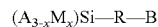

$(A_{3-x}M_x)Si$—R—B     (Scheme 1)

where A is an alkoxy or hydroxy group, halogen, or other group allowing at hydrolysis of the silane group, M is an alkyl group or hydrogen, R is a linking group, such as an alkyl chain, other hydrocarbon chain, aromatic group containing chain, organic chain, or other chain group, B is a functional group, and x is an integer between 0 and 3 inclusive. For example, precursors include alkoxysilanes according to Scheme 1, having functional groups as organic polymer chain formers, where R is an alkyl group with 1 to 20 carbons; A is an alkyloxy group such as $C_2H_5O$— or $CH_3O$—; M is $C_2H_5$— or $CH_3$—; and x is 1 or 2. B can be a functional group such as —OH, —SH, —CH=$CH_2$, —$NH_2$, epoxy ring, other polymerizable group, or other functional group.

Specific examples of such alkoxysilanes include (3-glycidoxypropyl) methyldiethoxysilane, (3-glycidoxypropyl)methyldimethoxysilane, (3-glycidoxypropyl)triethoxysilane, (3-glycidoxypropyl)trimethoxysilane, 3-mercaptopropyltrimethoxysilane, 3-mercaptopropylmethyldimethoxysilane, 3-aminopropyltriethoxysilane, 3-aminopropyltrimethoxysilane, 3-aminopropylmethyldiethoxysilane, 3-aminopropylmethyldimethoxysilane, n-(2-aminoethyl)-11-aminoundecyltrimethoxysilane, n-(6-aminohexyl) aminopropyltrimethoxysilane, (3-acryloxypropyl)-dimethylmethoxysilane, (3-acryloxypropyl)methyldimethoxysilane, (3-acryloxypropyl)trimethoxysilane, 3-(N-allylamino)propyltrimethoxysilane, allyltriethoxysilane, allyltrimethoxysilane, butenyltriethoxysilane, docosenyltriethoxysilane, (methacryloxymethyl)dimethylethoxysilane, methacryloxymethyltriethoxysilane, methacryloxymethyltrimethoxysilane, methacryloxypropyldimethylethoxysilane, methacryloxypropylmethyldimethoxysilane, methacryloxypropylmethyldiethoxysilane, methacryloxypropyltriethoxysilane, 7-octenyltrimethoxysilane, styrylethyltrimethoxysilane, vinyltrimethoxysilane, vinyl triethoxysilane and the like.

Precursors may also include molecules having two or more hydrolysable silicon-containing groups linked by flexible organic chains. For example, bisalkoxysilyl terminated polymers or bisalkoxysilyl ended short organic chains can also be used as organic chain formers in this invention, for example as shown in Scheme 2.

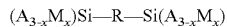  (Scheme 2)

Here, A, M, R, and the subscript (x) may be as described above in relation to Scheme 1. A, M, and subscript (x) may be the same or different for the two silicon-containing groups. For example, R can be an organic chain; A can be an alkyloxy group such as C2H5O— or CH3O—, hydroxyl group, or halogen; M can be an alkyl group such as C2H5- or CH3-; and x can be 1 or 2.

Specific examples include: bis(3-methyldimethoxysilyl)propyl)-polypropylene oxide, bis(triethoxysilyl)ethane, bis(triethoxysilyl)octane, bis(triethoxysilylethyl)benzene, and the like.

Metal cations of one or more different species, such as Mg2+, Ca2+, Sr2+, Ba2+, Fe2+, Al3+, Pb2+, Zr+4, Mo6+, Nb4+, Ti4+, Ti3+, V5+, or Co2+, can be implanted into the framework of the proton conductive membrane through a sol-gel process. The metal containing precursors were prepared in solution, which was introduced into gel type of the polymers described above to make implanted membranes.

Precursors used to introduce the metal species include organometallic compounds including metal cations, the metal cations being, for example, cations of one or more different metal species, such as Mg, Ca, Sr, Ba, Al, Fe, W, Zn, Mn, Zr, Mo, Nb, Ti, V, Co, Pb, Ga, In, Ge, and Sn. Metal cations are implanted into the inorganic-organic matrix of the proton conductive membrane through a process involving other precursors, such as silane precursors, where the process may involve one or multiple steps of sol gel processes, or hydrothermal processes, or other process. In an example approach, metal containing precursors are prepared in solution, and the solution is then added into a silane mixture (such as a gel) of the inorganic-organic hybrid precursors described above. A sol-gel process is then to make implanted membranes. A hybrid inorganic-organic matrix is formed having metals distributed through the inorganic portion of the matrix, for example through a polymerization (in this case a copolymerization) including hydrolysis and polycondensation.

A hybrid inorganic-organic matrix may contain regions having a structure such as —C—C—Si—O—Zr—O—Si—C—C—, where C is carbon, e.g. from organic groups in the silane precursors. Additional bonds to C, Si, and Zr are not shown for clarity. More generally, regions may have a structure such as -A—O—Si—O-A-, or —O—Si—O-A-O—Si—O—, where A is a metal. The metal cation may be one having similar properties and similar ion size to Si4+, including but not limited to Ti4+, Zr4+, or Al3+.

In other examples, a chemical structure is formed having regions such as —C-A-O—B—O-A-C— or —C-A-O—B—O, where: C is carbon; O is oxygen; A is a cation such as Si, but which may also be Al, Ti, Zr, P. S, Ga, Ge As or Se, but not limited thereto; and B is a metal cation such as a cation of Mg, Ca, Sr, Ba, Mn, Fe, Al, Pb, Zr, Mo, Nb, Ti, V, or Co. The carbon atoms C originate, for example, from the organic group of an organic-group containing precursor, such as an organosilane, organogermane, or other organic-group containing precursor. Example alkoxymetal precursors that can be used to implant metal cations into the network include isopropoxides, n-butoxides, sec-butoxides, and the like, and also metal compounds having one or more hydrolysable groups such as halogen, hydroxyl, alkyloxy, aryloxy, alkyl, carboxy, amino, or other functional group.

Process to Graft Phosphonic Acid Groups onto the Implanted Metal Ions

Phosphonic acid groups were grafted on to the implanted membrane materials by immersing the membrane in a phosphoric acid solution for a predetermined time. The dry membranes with implanted metal ions are immersed in the acid solutions for a certain time to graft phosphonic acid groups on to the hybrid inorganic-organic polymer network. The acid solution may comprise H3PO4 as the only acid type, or may comprise a mixture of H3PO4 and other acids as shown in Scheme 3 and Scheme 4 below, or comprise one or more acid molecules including a phosphonic acid group. The solvent may be water, methanol, ethanol, or other organic solvent, such as solvents with a boiling point less than 100° C.

In other examples, the acid comprises a phosphonic acid group connected with other acid groups by organic chains, for example as shown in Scheme 3.

Scheme 3

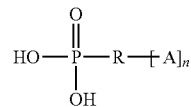

For example, A is an acid group, n is 1, 2 or 3, and R is an organic chain. Examples of acid groups A include, but are not limited to, —PO3H2, —SO3H, —CO2H, and —SO2NHSO3.

Specific examples include benzenesulfonic acid, 4-(2-phosphonoethyl)-:

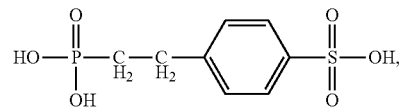 [SMILES: O=P(O)(O)CCc1ccc(S(=O)(=O)O)cc1]

2-phosphono-ethanesulfonic acid:

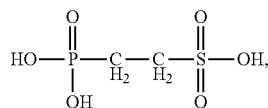

(nitrilotris(methylene))trisphosphonic acid,

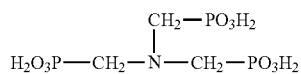

and 2-phosphonobutane-1,2,4-tricarboxylic acid:

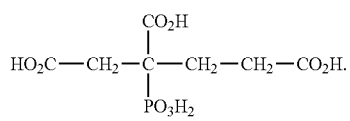

In further examples, acid molecules may comprise phosphonic acid groups connected with heterocycle groups by organic chains, for example as shown in Scheme 4.

Scheme 4

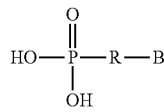

Examples of acids according to Scheme 4 include acid molecules in which a phosphorus-containing acid group is connected through a linking group to a heterocycle. Example heterocycles include aromatic heterocycles having at least one heteroatom providing a lone pair of electrons (such as N, O, and/or S).

For example, B can be an aromatic heterocycle group with at least one nitrogen, sulfur, and/or oxygen heteroatom, and R can an organic chain. Example heterocycles (B) include, but are not limited to, imidazole, benzimidazole, 1,2,4-triazole, 1,2,3-triazole, pyrimidine, purine, and pyrazine. Specific examples of acids corresponding to Scheme 4 include:

3-(1H-1,2,4-triazol-3-ylthio)propylphosphonic acid:

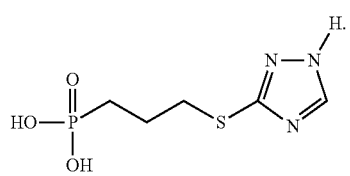

3-(1H-imidazol-4-ylthio)propylphosphonic acid:

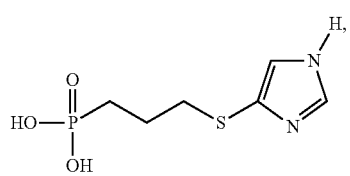

3-(pyrimidin-2-ylthio)propylphosphonic acid:

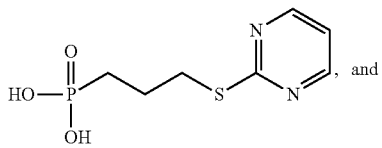 [SMILES: O=P(O)(O)CCCSc1ncccn1]

2-(((1H-1,2,3-triazol-4-yl)methoxy)methoxy)ethylphosphonic acid:

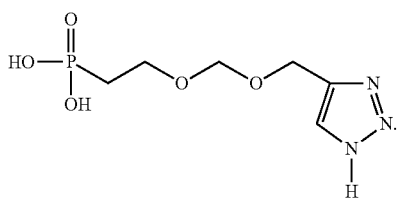 [SMILES: O=P(O)(O)CCOCOCc1c[nH]nn1]

Example 1

Membrane Preparation

Bis(3-methyldimethyoxysilyl)polypropylene oxide (MD-SPPO, Gelest, 96%; MW 600-900), 1,4-bis(trimethoxysilylethyl) benzene (BTMSEB, Gelest, 98%) and ethanol were mixed and stirred for 20 minutes, while 0.5 N HCl aqueous solution was added to form a solution with primary organic chain.

A $Zr^{4+}$ ion containing solution was prepared by mixing Zr(OBu)4, acetylacetone and ethanol. The organic chain containing solution was added into the $Zr^{4+}$ ion containing solution to form a sol, which was cast on petri dishes. The Zr-containing membrane was dried at 60° C. for 3 days, at 80° C. for 3 hours, and then at 100° C. for 1 hour to evaporate the organic solvents and water. Phosphonic acid groups were grafted on the Zr-containing membrane by immersing the membrane in H3PO4 solution for 48 hrs, following by drying at 60° C. for 3 days, at 80° C. for 3 hours, and then at 100° C. for 1 hour to form the final membrane. The proton conductivity was measured by impedance spectroscopy using a SI 1255 frequency response analyzer and a SI 1286 potentiostat/galvanostat in the frequency range of 0.01 Hz to 5 MHz.

Example 2

Sample Structure

Figure 4:
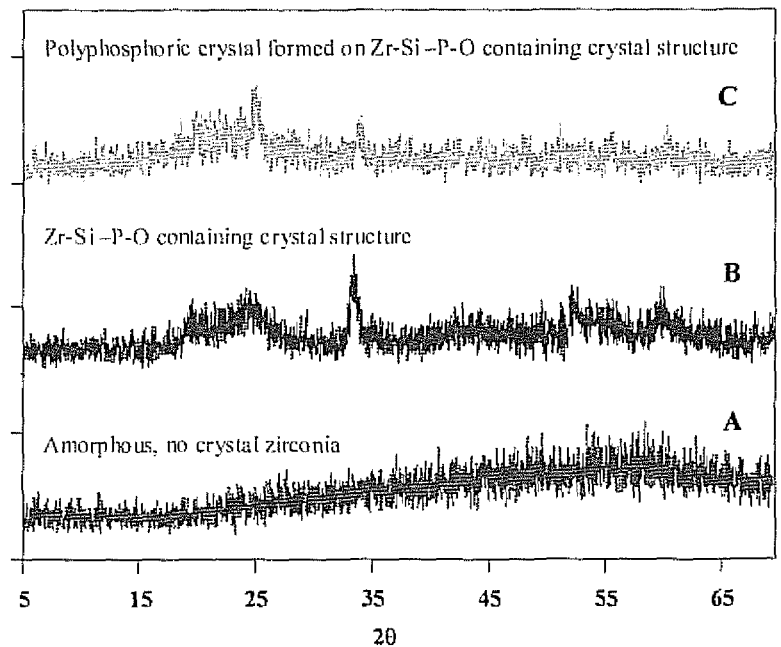
FIG. 4 shows XRD patterns of Zr-containing hybrid membranes, curve A without grafted phosphoric acid, curve B after immersion in 2.5 M H3PO4 solution for 48 hrs, and curve C after immersion in 10 M H3PO4 solution for 48 hr, with all samples dried before the XRD experiment.

FIG. 4, curve A, is an XRD spectrum of dried Zr-containing membrane, showing that it does not contain crystalline zirconium oxide formed in the membrane. In order to study the interaction of H3PO4 and implanted Zr ions, the sample having spectrum A was immersed in 2.5 M and 10 M H3PO4 solution, respectively, and dried at 60° C. for 3 days, at 80° C. for 3 hours, and then at 100° C. for 1 hour. XRD spectra of dried membranes, curves B and C, show distinct crystal peaks are different than reported for crystal α-ZrP. It suggests that small crystals of Zr—(Si)—P—O—H are formed in the membrane material. With increasing concentration of H3PO4 solution, the peak at 34° decreased and at 28° increased. The change in crystal structure is unclear. However, crystallization of phosphoric acid might occur on the original Zr—

(Si)—P—O—H crystals. Furthermore, the XRD results indicate that implanted Zr4+ ions and grafted phosphonic acid groups have been highly dispersed within the inorganic-organic hybrid membrane.

Figure 5:
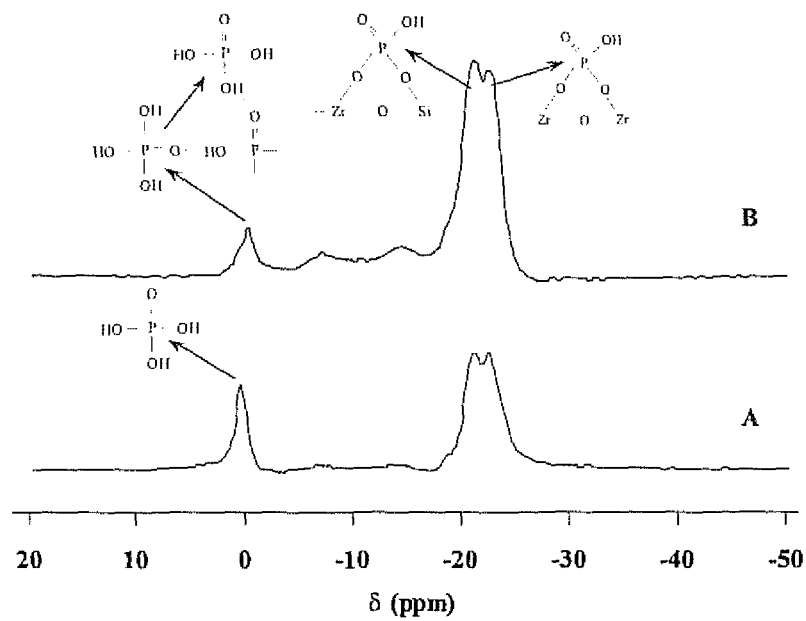
FIG. 5 shows 31P NMR spectra of Zr-containing hybrid membranes.

FIG. 5 shows 31P NMR spectra of Zr-containing hybrid membranes. Curve A corresponds to Zr/Si 0.67; curve B corresponds to Zr/Si=0.75. All samples were immersed in 2.5 M H3PO4 solution for 48 hrs and dried at 60° C. for 20 hrs.

There are four main peaks at 0.4 ppm, −0.4 ppm, −21.4 ppm and −22.9 ppm, which can be assigned to H3PO4, the crystal form of H3PO4, P—Zr—O and P—Zr—Si—O composites (shown in the figure), respectively. The results indicate that PO43-tetrahedron in the groups attached to Zr ion has been distorted due to decrease in electron density. About 65% of the phosphoric acid (−21.4 and −22.9 ppm) is grafted on to the hybrid copolymer framework. With increase of Zr/Si ratio, amount of grafted phosphoric acid increased to 77%, and free H3PO4 at 0.4 ppm dramatically decreased.

Figure 6:
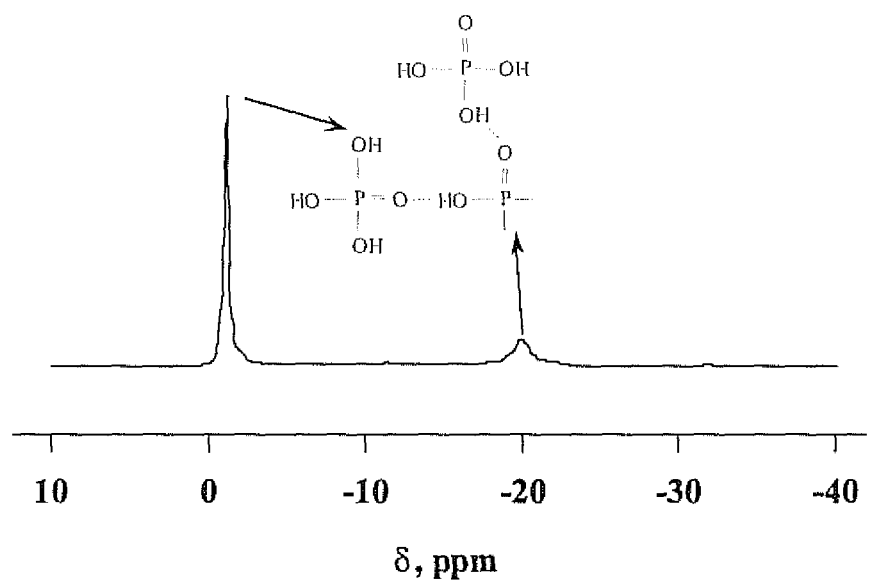
FIG. 6 shows a 31P NMR spectrum of Zr-containing hybrid membranes, with Zr/Si=0.75.

FIG. 6 shows 31P NMR spectrum of Zr-containing hybrid membranes, with Zr/Si=0.75. Samples were immersed in 10 M H3PO4 solution for 48 hrs and dried at 60° C. for 20 hrs.

Moreover, this figure indicates that the membrane could adsorb much more phosphoric acid when immersed into a higher concentration H3PO4 solution. The NMR and XRD results show that more Zr-ions were implanted and more phosphoric acid was present in the form of grafted phosphoric groups. Small polyphosphoric crystals may be formed around highly dispersed Zr—(Si)—P—O structures.

Example 3

Proton Conductivity

High proton conductivity has been obtained with the Zr-implanted and phosphoric acid grafted hybrid membrane under low RH and over a wide temperature range (from room temperature to 120° C.).

Example 4

Proton Conductivity

Zirconium and phosphoric acid are known to be non-corrosive, non-toxic, and inexpensive. Therefore, the membrane developed here is very attractive to replace current Nation type membrane for future applications in PEM FC. ZrP is an effective promoter of proton conductivity in gel type materials, and has been studied previously e.g. ZrP/Nafion, sulfonated poly(ether, ketones) incorporating nano-size ZrP, layered zirconium sulfoarylphosphonated-based hybrid polymer membranes etc. However, none of these previous approaches have shown the high proton conductivity under low humidity obtained with examples of the present invention.

Figure 8:
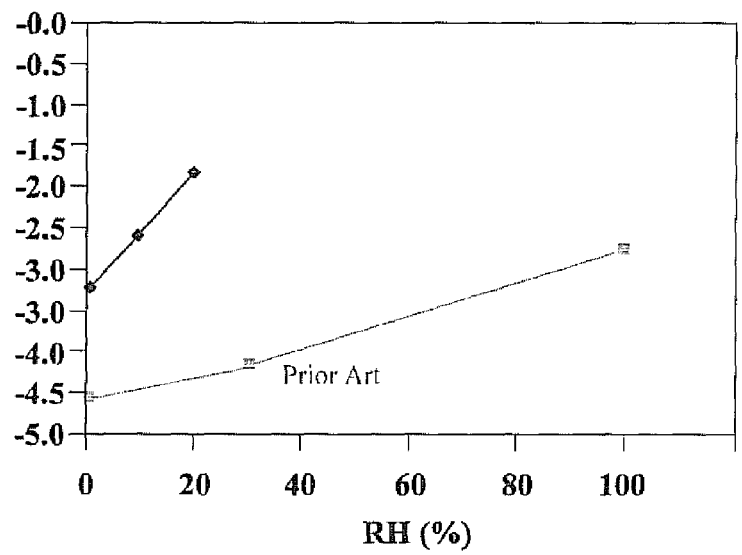
FIG. 8 shows proton conductivity of a Zr-implanted membrane.

FIG. 8 shows a proton conductivity comparison with the best results reported with ZrP in literature. Samples were tested at room temperature under various RH conditions.

Example 5

Stability Tests on Zr Containing Membranes

The samples doped with H3PO4 were boiled in water (50 ml for all tests) for 2 hours, and then dried at 60° C. in air. The test can be considered as representing the most severe PEM fuel cell conditions. The amount of Zr lost in the boiling process was obtained by determining the Zr content in the water using ICP spectroscopy. The results were list in the following table. It is found that only very small amount of Zr was lost in boiling process, indicating that Zr is very much stable in the hybrid inorganic-organic membranes.

| Composition | Before Boiling | After boiling | Total Zr | Zr lost | Ratio of Zr lost |
|---|---|---|---|---|---|
| 2M-1Be—2Zr (2.5 M acid) | 0.9675 g | 0.8574 g | 155.2 mg | 0.00025 mg | 0.00017% |
| 2M-2Be—3Zr (2.5 M acid) | 0.4203 g | 0.3767 g | 78.1 mg | 0.000105 mg | 0.00015% |
| 2M-2Be—3Zr (10 M acid) | 0.6899 g | 0.4413 g | 91.1 mg | 0.0177 mg | 0.019% |
| 2M-1Oc-3Zr (10 M acid) | 1.8271 g | 1.0015 g | 290.6 mg | 0.03715 mg | 0.012% |

Figure 7:
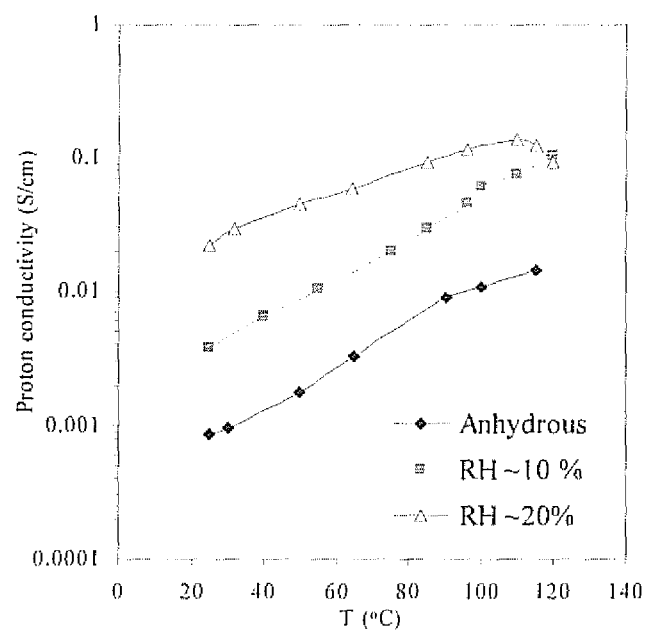
FIG. 7 shows proton conductivity of a Zr-containing hybrid membrane with Zr/Si=0.75, under various relative humidity conditions.

FIG. 7 shows proton conductivity of the membrane (Zr/Si=0.75) under various relative humidity (RH) conditions. Samples were immersed in 10M H3PO4 solution at room temperature (RT) for 48 hrs, and dried at 60° C. in Ar for 12-24 hrs.

In anhydrous condition, the proton conductivity is over 10-3 S/cm at room temperature, and 10-2 S/cm at 120° C. Under 10% RH, proton conductivity is over 10-2 S/cm at room temperature and reaches and 10-1 S/cm at 120° C. However, with increase of RH to 20%, decrease of proton conductivity was observed at the temperature higher than 115° C. The results suggests that high humidity may cause aggregation of small phosphoric crystals or loss of the crystal phosphoric acid tied to the Zr—(Si)—P—O—H composite.

31P NMR tests

The samples for 31P NMR tests were dried in air for 3 days after boiling tests.

Figure 9A:
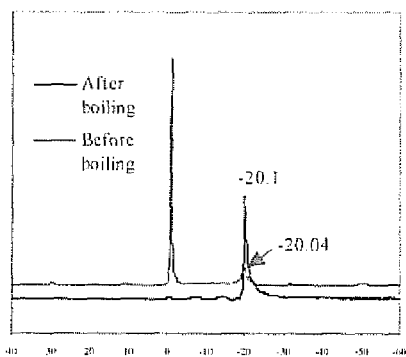
FIGS. 9A and 9B show 31P NMR spectra of a 2M-2Be-3Zr membrane after stability testing.
Figure 9B:
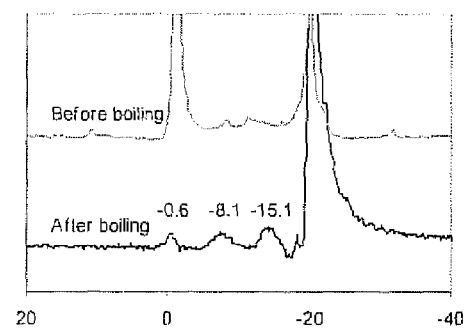

FIGS. 9A and 9B show 31P NMR spectra of 2M-2Be-3Zr immersed in 10 M H3PO4 for 20 hours. The membrane was boiled in water for 2 hours. FIG. 9B shows a detail of the spectrum shown in FIG. 9A.

Figure 10:
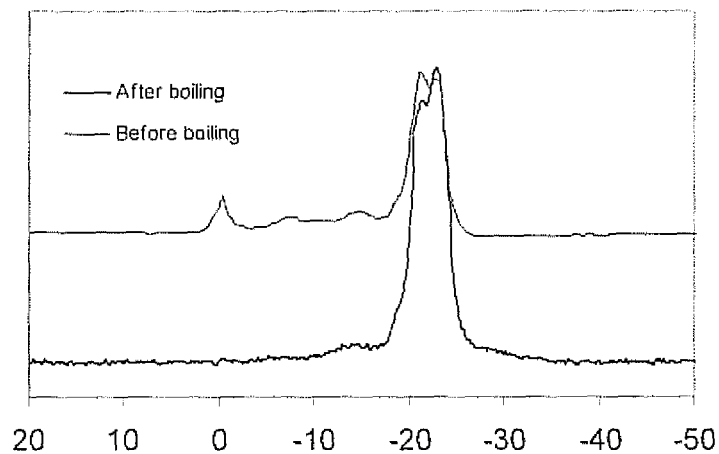
FIG. 10 shows 31P NMR of a 2M-2Be-3Zr membrane after stability testing.

FIG. 10 shows 31P NMR of 2M-2Be-3Zr immersed in 2.5 M H3PO4 for 48 hours. It was boiled in water for 2 hours.

Figure 11:
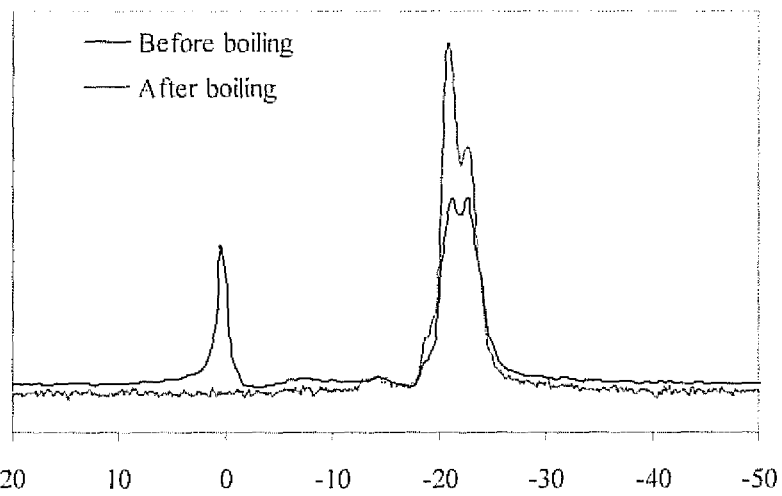
FIG. 11 shows 31P NMR of a 2M-1Be-2Zr membrane after stability testing.

FIG. 11 shows 31P NMR of 2M-1Be-2Zr immersed in 2.5 M H3PO4 for 48 hours. It was boiled in water for 2 hours.

Comparing the spectra of the samples before and after boiling tests, the free H3PO4 was removed, but the peaks from P connected with Zr are very strong. Considering the fact that almost no Zr was lost in the boiling process, the Zr—O—P—H clusters are stable in the new membranes.

Example 6

Chemical Stability or Zr-Implanted Membranes: Fenton Test of 2M-1Be-2Zr

The Fenton test is considered one of the indicators of chemical stability of PEM under fuel cell operation condition. Considering the test conditions are normally much more severe than any realistic PEM fuel cell conditions, the failure of this test does not mean the membrane cannot be used in a PEM fuel cell application. But, a success in the test shows the membrane has application possibilities.

The testing condition were:

$H_2O_2$ solution: 3% $H_2O_2$, 2 pp m $Fe^{2+}$ (2 mg $FeSO_4$ in 1 liter).

Sample (1): 2 M-1Be-2Zr immersed in 2.5 M $H_3PO_4$ for 48 hours, and dried;

Sample (2): 2 M-1Be-2Zr immersed in 2.5 M $H_3PO_4$ for 48 hours and then boiled in water for 2 hours, and dried.

Sample (1) was immersed in H2O2 solution for about 26 hours, with no visible dissolution, no shape change, no visible change in mechanic properties, and no color change. After seven days, there was no visible dissolution, no shape change, but it became brittle.

Sample (2) was immersed in H2O2 solution for about 26 hours, with no shape or color change, and no visible change in mechanic properties. After seven days, there was no visible dissolution, and no shape change. It became brittle.

Example 7

Distribution of Metal Oxide or Acid Sources in Hybrid Inorganic-Organic Polymer Membranes with Implanted Zr Transmission electron microscopy (TEM) was undertaken using a Hitachi HF2000 Field Emission Electron Gun Transmission Microscope operating at 200 kV. The boiled sample with composition of 2M-1Be-2Zr was immersed in pure alcohol overnight, and then crushed in an agate pestle and mortar under alcohol. The slurry was coated onto holey carbon film supported by a copper grid. The sample was stable under the electron beam for TEM examination.

Figure 12:
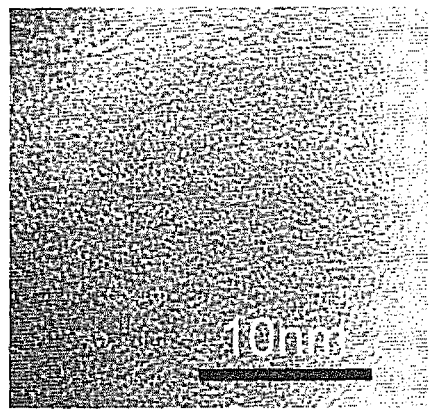
FIG. 12 shows a TEM bright field image of a Zr-implanted membrane.
Figure 13:
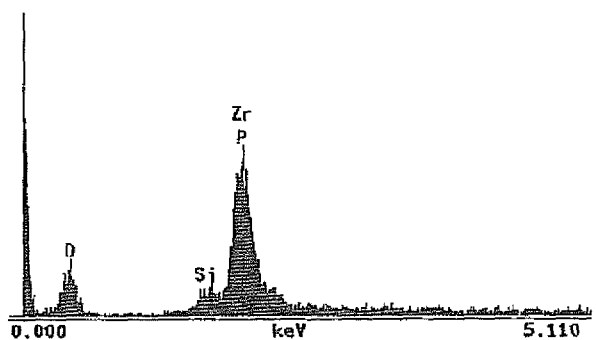
FIG. 13 shows an EDAX spectrum of a Zr-implanted membrane.

FIG. 12 shows a TEM bright field image of Zr-membrane, and FIG. 13 shows an EDAX spectrum on the area of image of FIG. 11A.

As shown in FIG. 12, the contrast of the image is homogeneous, implying that there is no nanoscale aggregation of Zr, P, and Si. If there were local aggregations of Zr, P, and Si, an obvious mass contrast would be observed. Checking at different focusing, over-focusing and de-focusing, even in different magnifications and other areas also confirmed this conclusion. Selected area diffraction showed that the sample was amorphous, which is consistent with the high-resolution bright field image (FIG. 12), and also with the XRD characterization results. The EDAX was carried out with the beam size of 20 nm on the above area, in which Zr, P, Si and oxygen were detected. Since these elements are detected and there is no element aggregation in the same area, it suggests that they are distributed in the polymer uniformly on the nanoscale.

Example 8

Stability of Conductivity in High Relative Humidity

The testing conditions were 100° C. with 100% relative humidity (RH). Sample 2, M-1Be-2Zr, was placed in 2.5 M H3PO4 for 48 hours, and dried for 7 days in air at 60° C.

Figure 14:
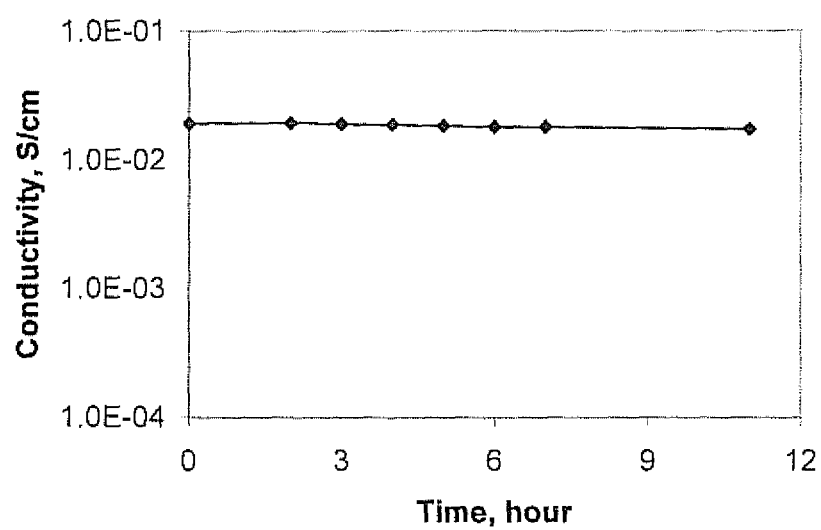
FIG. 14 shows conductivity of a 2 M-1Be-2Zr membrane measured at 100° C. with 100% RH.

FIG. 14 shows very little change in conductivity when the sample was tested at 100° C. with 100% RH for 11 hours.

One or more species of metal cations, such as cations of alkali earth metals, transition metals, or other metals, can be introduced into the hybrid inorganic-organic matrix. For example, the cations may be cations of one or more metals selected from the group consisting of Mg, Mn, Zr, Mo, Nb, Ti, V, and Co. The metal cations withdraw electrons from grafted acid groups, such as phosphoryl groups, lowering their electron density, and increasing proton mobility in the hybrid membrane. As a result, the low temperature proton conductivity, thermal stability, and acidity of the novel metal-containing membranes can be improved.

Other Examples

Silane precursors may include organic chain formers, used to provide organic polymer chains in the membrane. Examples include alkoxysilanes having a polymerizable functional group, that can be polymerized into an organic chain. Other examples include bisalkoxysilyl terminated polymers or bisalkoxysilyl terminated short organic chains, such as bis(3-methyldimethoxysilyl)(propyl)polypropylene oxide, bis(triethoxysilyl)ethane, bis(triethoxysilyl)octane, bis(triethoxysilylethyl)benzene, and the like. Examples also include bis(alkyloxysilyl)-terminated silanes of the form Si(A3-xBx)-R—Si(A3-xBx), where A can be a hydrolysable group (such as an alkyloxy group, hydroxyl group, halogen, hydrogen, or other substituent), and B can be, for example, an alkyl group or hydrogen, and where R is a flexible chain. Examples of flexible chains include polypropylene oxide, polytetraethylene oxide, poly(1-butene), polyethylene, polypropylene, polyvinylidene fluoride, polystyrene, polytetrafluoroethylene, polyvinylchloride, and polyvinylalcohol. Other examples of flexible chains include straight chain alkyl groups with 2-20 carbon atoms, polyethylene oxide (PEO), polypropylene oxide (PPO) and polytetramethylene oxides (PTMO), derivatives thereof, other chains comprising carbon, hydrogen, and optionally oxygen, and other chains.

Acids which may exist bound to the PEM matrix, or in free form, may include inorganic acids, such as a phosphorus-containing acid group (such as phosphonic acid group, —PO3H), sulfur-containing acid group (such as a sulfonic acid group, —SO3H, and —SO2NHSO3), boron-containing acid group (such as a boronic acid group, —B(OH)2), and the like. The acid group can also be an organic acid group such as a carboxylic acid group (—COOH). Two or more different acid groups may be provided. Atoms proximate to the acid group may be fluorinated, or otherwise have an electron-withdrawing group attached.

Functional groups include acrylate, methacrylate, epoxy, styrene, urethane, vinyl, hydroxyl (—OH), halogen (—X), thiol (—SH), amino (such as —NH2), and other functional groups known in the chemistry arts. Functional groups include groups that polymerize with like groups, or copolymerize with other functional groups provided by other precursors, groups which may participate in addition reactions or in other chain-forming reaction. A silane precursor may comprise a functional group connected to a silane group through a linking group. Silane precursors which may be used to form a hybrid inorganic-organic matrix include organofunctional silane monomers having functional groups such as mercapto, vinyl, amino, epoxy, acrylate, methacrylate, halo (e.g. chloro) or other functional group. Various examples are also listed in U.S. Pat. No. 4,716,194 to Walker et al.

Linking groups may include one or more carbon atoms, double bonds, oxygen atoms, rings (such as phenyl groups) or other atoms, and may be straight or branched. In other examples, a covalent bond may take the place of the linking group. The linking group may be an organic group, which may include an alkyl, alkenyl, or alkynyl group, halogenated or other substituted group such as a fluoroalkyl, linear and branched chains, and cyclic groups (including aromatic cyclic groups). Linking groups may include alkyl chains, such as alkyl chains having 1-20 carbon atoms (such as 2-5 carbon atoms) in one or more alkyl groups. Examples of linking groups include aliphatic hydrocarbon groups having 1 to 20 carbon atoms (such as alkyl or alkenyl), and other flexible chains. The linking group may also include one or more aromatic rings, such as a benzene ring, or one or more atoms such as oxygen (for example, in an ether or ester linkage), or sulfur. A linking group may also contain an electron withdrawing group so as to enhance the acidity of any attached acid group. The electron withdrawing group can be a halogen atom, such as a chlorine or fluorine atom.

Heterocycles may also be bound to the matrix, such as nitrogen-containing heterocycles including imidazole, benzimidazole, pyrazole, pyrazine, pyridine, 1,2,4-triazole, 1,2,3-triazole, 1H-benzotriazole, pyrimidine, pyrazole, pyridine, pyrazine, purine, and the like, or derivatives thereof. A heterocycle can be a nitrogen-containing heterocycle having one or more electron-withdrawing groups as a substituent group, and derivatives thereof, such as fluorinated heterocycles. Further examples of nitrogen-containing heterocycles include phenylimidazole (e.g. 2-phenylimidazole), vinylimidazole, 2-methyl 4-ethyl imidazole, imidazole-2-carboxaldehyde, oxazole, carbazole, indole, isoindole, dihydrooxazole, isooxazole, thiazole, benzothiazole, isothiazole, imidazolidine, indazole, 4,5-dihydropyrazole, 1,2,3-oxadiazole, furazane, 1,2,3-thiadiazole, 1,2,4-thiadiazole, tetrazole, pyrrole, pyrrolidine, and pyrazole groups, and derivatives thereof.

Proton conducting materials can be used as membranes in fuel cells. A fuel cell according to the present invention includes a positive electrode, a negative electrode, and a proton exchange membrane as described herein. The dimensions of the membrane will be determined by the configuration of the fuel cell, as is well known. A typical PEM thickness for a fuel cell application may be in the range 50-500 microns, such as 200 microns. Proton conducting materials can be produced in a form suitable for use as a membrane without further processing, or formed as a tape or sheet that can be cut to a desired shape, or further processed. Hence, an example fuel cell according to the present invention includes a positive electrode, a negative electrode, a membrane therebetween formed from a proton conducting material described herein, and a source of fuel.

Proton electrolyte membranes (PEMs) or other forms of the polymers described herein can be used in fuel cells, hydrogen separation/purification, reforming/partial oxidation of hydrocarbon fuels, contaminant removal, gas sensing, other processes relevant to energy storage and conversion, ion-exchange membranes, extraction of a predetermined fluid component (such as an ion) from a fluid, acid catalysts in a chemical processing system, other ion conducting membranes, and selective ion-transmitting membranes.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. No. 60/570,692, filed May 13, 2004, is incorporated in its entirety.

Having described our invention, we claim:

1. A process for making a proton-exchange membrane, the process comprising:
   forming a metal-implanted hybrid inorganic-organic polymer through a sol-gel polymerization of one or more silane precursors in a medium containing metal cations, the metal-implanted hybrid inorganic-organic polymer having an inorganic portion comprising silicon, oxygen, and implanted metal cations; and
   exposing the metal-implanted hybrid inorganic-organic polymer to an acid compound, so as to form the proton-exchange membrane,
   the acid compound directly attaching to the metal-implanted hybrid inorganic-organic polymer through an interaction between the acid compound and the implanted metal cations,
   the acid compound being selected from a group of compounds consisting of free mineral acids and organic acids,
   the interaction between the implanted metal cations and the acid compound having an electron withdrawing effect on the acid compound, so as to increase proton mobility within the proton-exchange membrane.

2. The process of claim 1, the acid compound including a phosphoric acid group.

3. The process of claim 1, wherein the acid compound is represented by the formula A-L-B, wherein A is an acid group, L is a linking group or a chemical bond, and B is a group including a second acid group or an aromatic heterocycle including at least one heteroatom selected from the group consisting of N, O, and S.

4. The process of claim 3, wherein B is a group including an aromatic nitrogen-containing heterocycle.

5. The process of claim 3, wherein A is a phosphonic acid group.

6. The process of claim 1, wherein the one or more silane precursors include at least a first silane and a second silane.

7. The process of claim 1, wherein the medium containing the metal cations is a medium including a dissolved alkoxymetal compound.

8. The process of claim 1, wherein exposing the metal-implanted hybrid inorganic-organic polymer to an acid compound includes infusing a solution of the acid compound into the metal-implanted hybrid inorganic-organic polymer.

9. The process of claim 1, wherein the metal cations are cations of one or more metals selected from the group of metals consisting of Mg, Ca, Sr, Ba, Al, Fe, W, Zn, Mn, Zr, Mo, Nb, Ti, V, Co, Pb, Ga, In, Ge, and Sn.

10. The process of claim 1, wherein the metal cations are cations of one or more metals selected from the group consisting of alkaline-earth metals, transition metals, rare-earth metals, group 13 metals, and group 14 metals.

11. The process of claim 1, wherein forming the metal-implanted hybrid inorganic-organic polymer comprises:
   providing a medium including one or more silane precursors and a hydrolysable metal compound; and initiating a sol-gel process, the sol-gel process including hydrolysis of the of the one or more silane precursors and hydrolysis of the hydrolysable metal compound.

12. The process of claim 11, wherein the hydrolysable metal compound is an alkoxymetal compound.

13. The process of claim 1, wherein the metal cations are cations of one or more metals selected from the group consisting of titanium, zirconium, and aluminum.

14. The process of claim 1, wherein the metal cations are zirconium cations.

15. The process of claim 1, wherein the inorganic portion of the hybrid inorganic-organic polymer includes regions having a structure -A-O—Si—, wherein A represents the implanted metal cation.

* * * * *

UNITED STATES PATENT AND TRADEMARK OFFICE
CERTIFICATE OF CORRECTION

| | | |
|---|---|---|
| PATENT NO. | : 8,465,857 B2 | Page 1 of 1 |
| APPLICATION NO. | : 12/885926 | |
| DATED | : June 18, 2013 | |
| INVENTOR(S) | : Wen Li et al. | |

It is certified that error appears in the above-identified patent and that said Letters Patent is hereby corrected as shown below:

On the title page, under "Other Publications," delete "1995" and insert --1998--;

On title page 2, under "Other Publications," change "L. Depre at al." to --L. Depre et al.--;

In the Claims

Claim 2, column 14, line 36, delete "phosphoric" and insert --phosphonic--; and

Claim 11, column 15, line 2, delete the second instance of "of the".

Signed and Sealed this
Eighteenth Day of February, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,465,857 B2 |
| APPLICATION NO. | : 12/885926 |
| DATED | : June 18, 2013 |
| INVENTOR(S) | : Wen Li et al. |

Page 1 of 1

It is certified that error appears in the above-identified patent and that said Letters Patent is hereby corrected as shown below:

On the title page, item 73 "Assignees," please add --Georgia Tech Research Corporation, Atlanta, GA (US)--.

Signed and Sealed this
Twenty-third Day of June, 2015

Michelle K. Lee
*Director of the United States Patent and Trademark Office*